United States Patent
Vasseur et al.

(10) Patent No.: US 9,563,440 B2
(45) Date of Patent: Feb. 7, 2017

(54) FAST LEARNING TO TRAIN LEARNING MACHINES USING SMART-TRIGGERED REBOOT

(71) Applicant: Cisco Technology, Inc., San Jose, CA (US)

(72) Inventors: Jean-Philippe Vasseur, Saint Martin d'Uriage (FR); Grégory Mermoud, Veyras (CH); Sukrit Dasgupta, Norwood, MA (US); Jonathan W. Hui, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 236 days.

(21) Appl. No.: 13/926,447

(22) Filed: Jun. 25, 2013

(65) Prior Publication Data
US 2014/0223155 A1  Aug. 7, 2014

Related U.S. Application Data

(60) Provisional application No. 61/761,116, filed on Feb. 5, 2013.

(51) Int. Cl.
*G06F 15/16* (2006.01)
*G06F 9/44* (2006.01)

(52) U.S. Cl.
CPC .................. *G06F 9/4405* (2013.01)

(58) Field of Classification Search
CPC .. H04L 47/24; H04L 2012/5684; H04L 69/40; G06F 9/4416; G06F 11/1441
See application file for complete search history.

(56) References Cited

U.S. PATENT DOCUMENTS

| | | | |
|---|---|---|---|
| 7,469,279 | B1 | 12/2008 | Stamler et al. |
| 7,533,178 | B2 | 5/2009 | Henniger |
| 7,688,795 | B2 | 3/2010 | Doshi et al. |
| 7,936,737 | B2 | 5/2011 | Doshi et al. |

(Continued)

OTHER PUBLICATIONS

Vasseur, et al., "Fast Learning to Train Learning Machines Using Smart-Triggered Reboot", U.S. Appl. No. 61/761,116, filed Feb. 5, 2013, 24 pages, U.S. Patent and Trademark Office.

(Continued)

*Primary Examiner* — Dustin Nguyen
*Assistant Examiner* — Kamran Mohammadi
(74) *Attorney, Agent, or Firm* — Parker Ibrahim & Berg LLC; James M. Behmke; Stephen D. LeBarron

(57) ABSTRACT

In one embodiment, a triggered reboot of a field area router (FAR) of a computer network is initiated, and gathered states of the FAR are saved. The nodes in the computer network are informed of the triggered reboot, and then feedback may be collected from the nodes in response to the triggered reboot. As such, it can be determined whether to complete the triggered reboot based on the feedback, and the FAR is rebooted in response to determining to complete the triggered reboot. In another embodiment, a node receives information about the initiated triggered reboot of the FAR, and determines whether it has critical traffic. If not, the node buffers non-critical traffic and indicates positive feedback in response to the triggered reboot, but if so, then the node continues to process the critical traffic and indicates negative feedback in response to the triggered reboot.

20 Claims, 8 Drawing Sheets

(56) References Cited

U.S. PATENT DOCUMENTS

| | | | |
|---|---|---|---|
| 8,102,848 B1* | 1/2012 | Rao | H04L 45/16 |
| | | | 370/253 |
| 8,145,789 B1 | 3/2012 | Stamler et al. | |
| 8,156,319 B2 | 4/2012 | Clemm et al. | |
| 8,504,814 B2 | 8/2013 | Murray | |
| 8,509,097 B1 | 8/2013 | Gourlay et al. | |
| 8,799,422 B1* | 8/2014 | Qu | H04L 45/00 |
| | | | 709/220 |
| 8,953,437 B1* | 2/2015 | Tiruveedhula | H04L 45/50 |
| | | | 370/218 |
| 2003/0018930 A1* | 1/2003 | Mora | H04L 67/104 |
| | | | 714/42 |
| 2005/0028026 A1* | 2/2005 | Shirley | G06F 11/1469 |
| | | | 714/6.3 |
| 2008/0104252 A1* | 5/2008 | Henniger | H04L 67/142 |
| | | | 709/227 |
| 2012/0110371 A1* | 5/2012 | Clemm | G06F 15/177 |
| | | | 714/4.2 |
| 2012/0182994 A1 | 7/2012 | Dec et al. | |
| 2012/0259990 A1* | 10/2012 | Akisada | H04L 41/0809 |
| | | | 709/228 |
| 2013/0010615 A1 | 1/2013 | Hui et al. | |
| 2013/0268590 A1* | 10/2013 | Mahadevan | H04L 41/0672 |
| | | | 709/204 |
| 2014/0101419 A1* | 4/2014 | Giddi | G06F 11/0742 |
| | | | 713/1 |

OTHER PUBLICATIONS

Winter, et al., "RPL: IPv6 Routing Protocol for Low-Power and Lossy Networks", Request for Comments 6550, Mar. 2012, 157 pages, Internet Engineering Task Force Trust.

* cited by examiner

FAST LEARNING TO TRAIN LEARNING MACHINES USING SMART-TRIGGERED REBOOT

RELATED APPLICATION

The present invention claims priority to U.S. Provisional Application Ser. No. 61/761,116, filed Feb. 5, 2013, entitled "FAST LEARNING TO TRAIN LEARNING MACHINES USING SMART-TRIGGERED REBOOT", by Vasseur, et al., the contents of which are incorporated herein by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and states, and performance indicators), recognize complex patterns in these data, and solve complex problems such as regression (which are usually extremely hard to solve mathematically) thanks to modeling. In general, these patterns and computation of models are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data. Note that the example above is an over-simplification of more complicated regression problems that are usually highly multi-dimensional.

Learning Machines (LMs) are computational entities that rely on one or more ML algorithm for performing a task for which they haven't been explicitly programmed to perform. In particular, LMs are capable of adjusting their behavior to their environment (that is, "auto-adapting" without requiring a priori configuring static rules). In the context of LLNs, and more generally in the context of the IoT (or Internet of Everything, IoE), this ability will be very important, as the network will face changing conditions and requirements, and the network will become too large for efficiently management by a network operator. In addition, LLNs in general may significantly differ according to their intended use and deployed environment.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
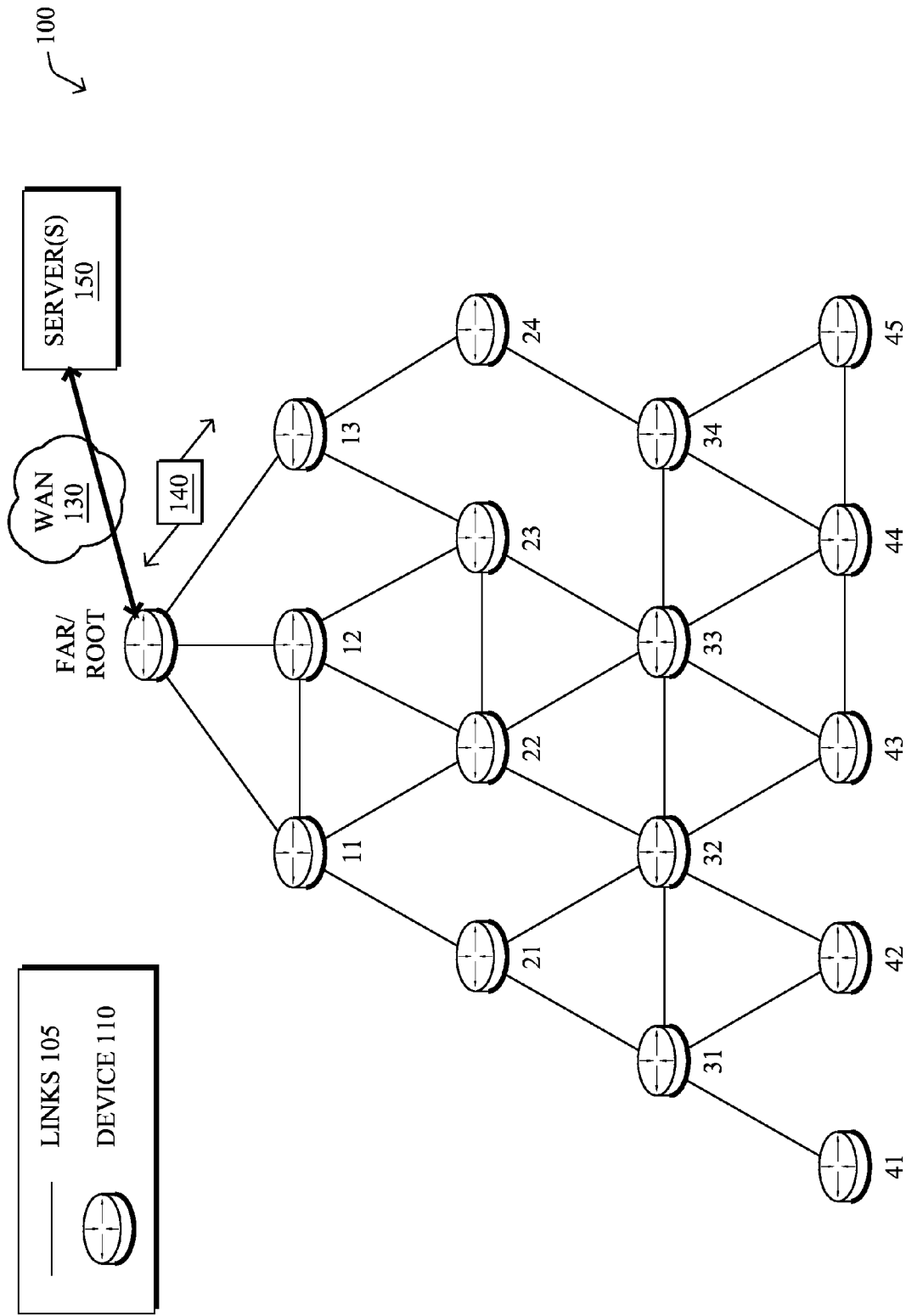
FIG. 1 illustrates an example communication network.

According to one or more embodiments of the disclosure, techniques are shown and described relating to fast learning to train learning machines using smart-triggered reboot. In one embodiment, a triggered reboot of a field area router (FAR) of a computer network is initiated, and gathered states of the FAR are saved. The nodes in the computer network are informed of the triggered reboot, and then feedback may be collected from the nodes in response to the triggered reboot. As such, it can be determined whether to complete the triggered reboot based on the feedback, and the FAR is rebooted in response to determining to complete the triggered reboot. In another embodiment, a node receives information about the initiated triggered reboot of the FAR, and determines whether it has critical traffic. If not, the node buffers non-critical traffic and indicates positive feedback in response to the triggered reboot, but if so, then the node continues to process the critical traffic and indicates negative feedback in response to the triggered reboot.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
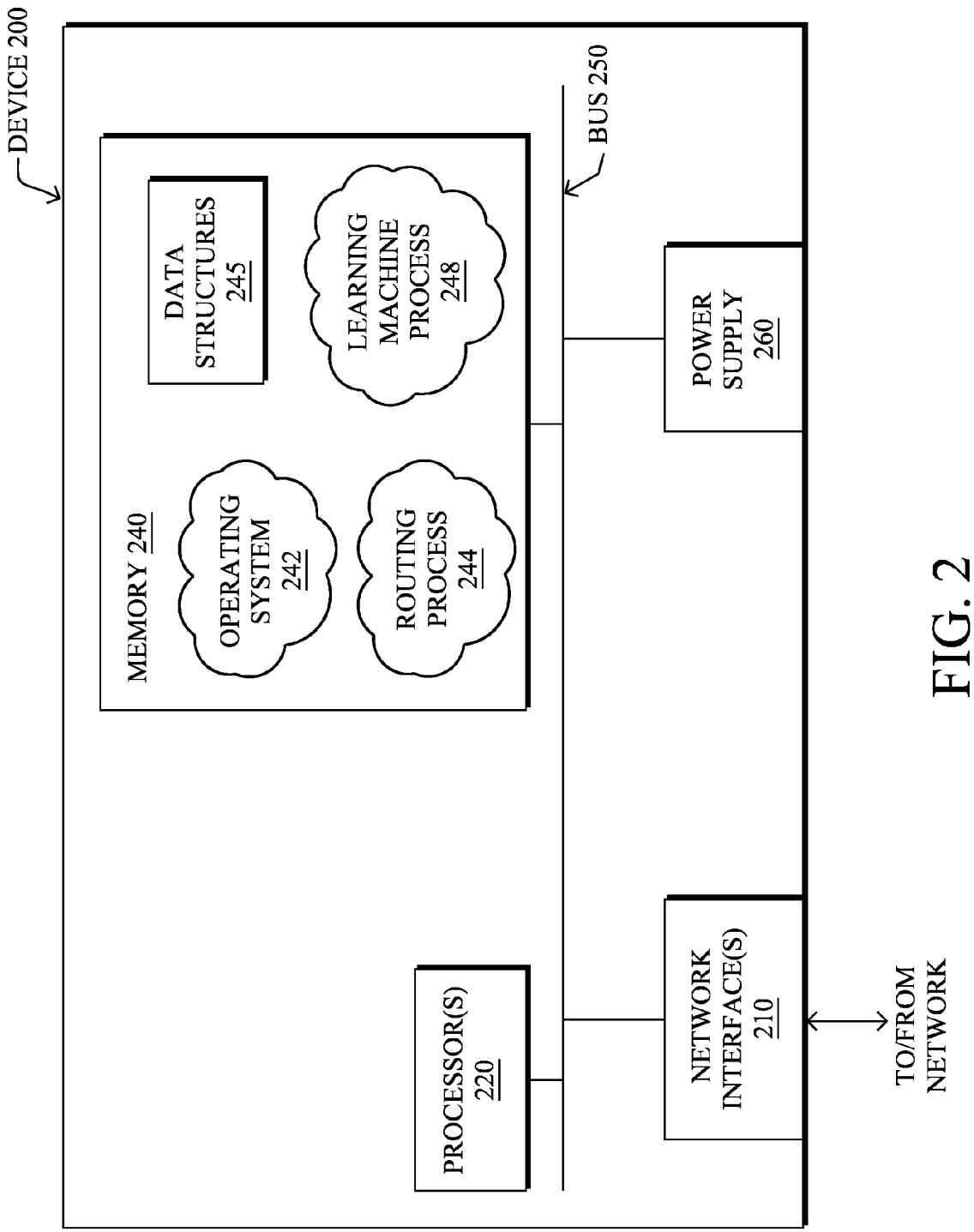
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
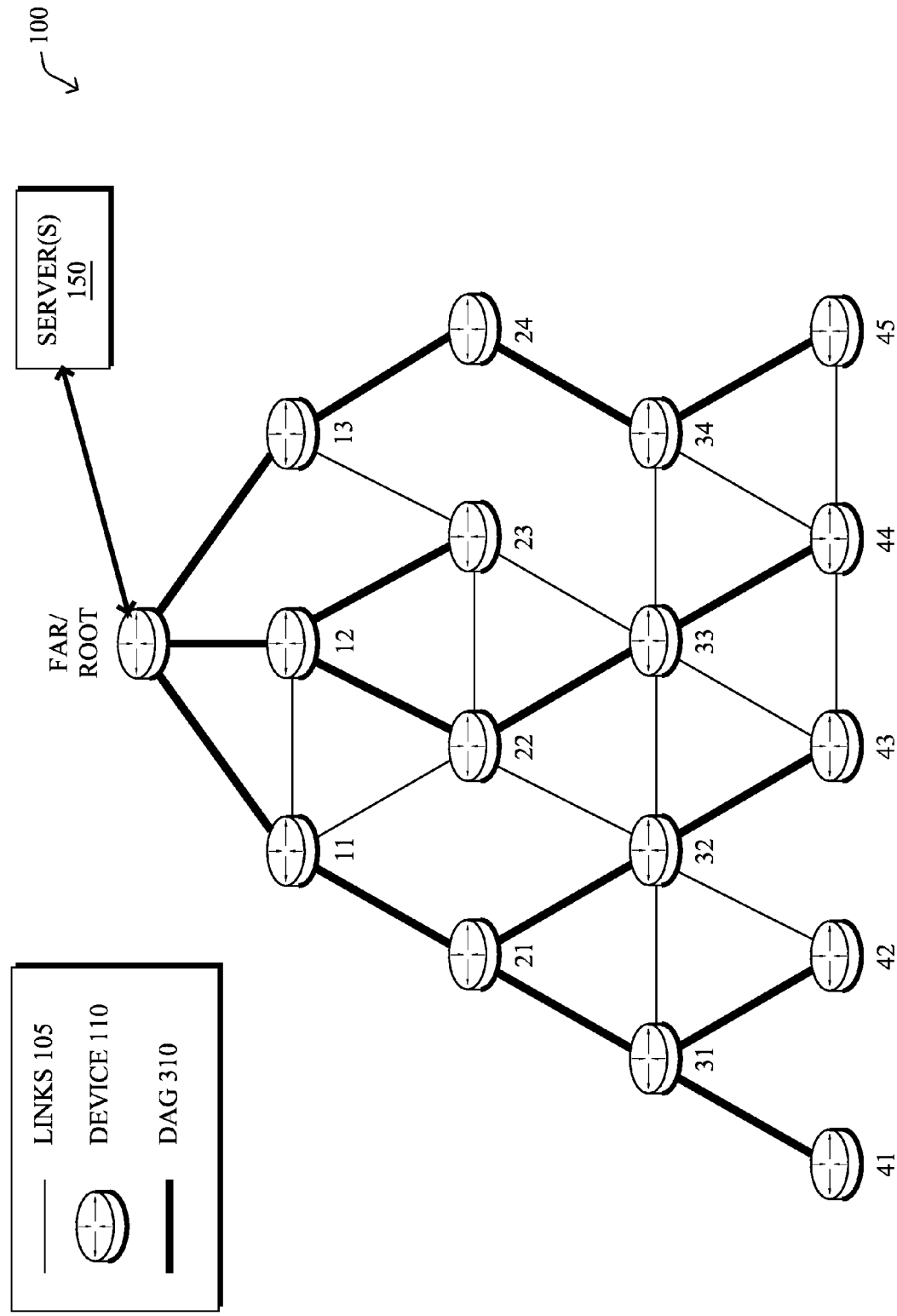
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

Learning Machine Technique(s)

As noted above, machine learning (ML) is concerned with the design and the development of algorithms that take as input empirical data (such as network statistics and state, and performance indicators), recognize complex patterns in these data, and solve complex problem such as regression thanks to modeling. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

One of most critical performance metrics of LLNs perceived by end-users such as utilities, is the time for a node to join a network, thus directly impacting the time for the mesh to become operational, especially after a FAR reboot/crash. Indeed, in order to join a mesh, a typical LLN device must complete a number of steps:

1) Discover a PAN (i.e. a specific network in IEEE 802.15.4 terminology);
2) Perform 802.1x-based mutual authentication and obtain link security keys;
3) Discover a default route (e.g., by using RPL, which by itself involves a number of steps);
4) Configure a global IPv6 address (e.g., by using DHCPv6); and
5) Advertise a global IPv6 address to configure downward routes (e.g., by using RPL);

The ratio of LLN devices to FARs can be anywhere from 1000 to 5000 LLN devices for every FAR. As a result, each PAN will typically contain from 1000 to 5000 LLN devices. Furthermore, LLN deployments can be dense and LLN devices can easily have hundreds of neighbors. For these reasons, properly building a stable network topology can take tens of minutes, if not hours.

Figure 4:
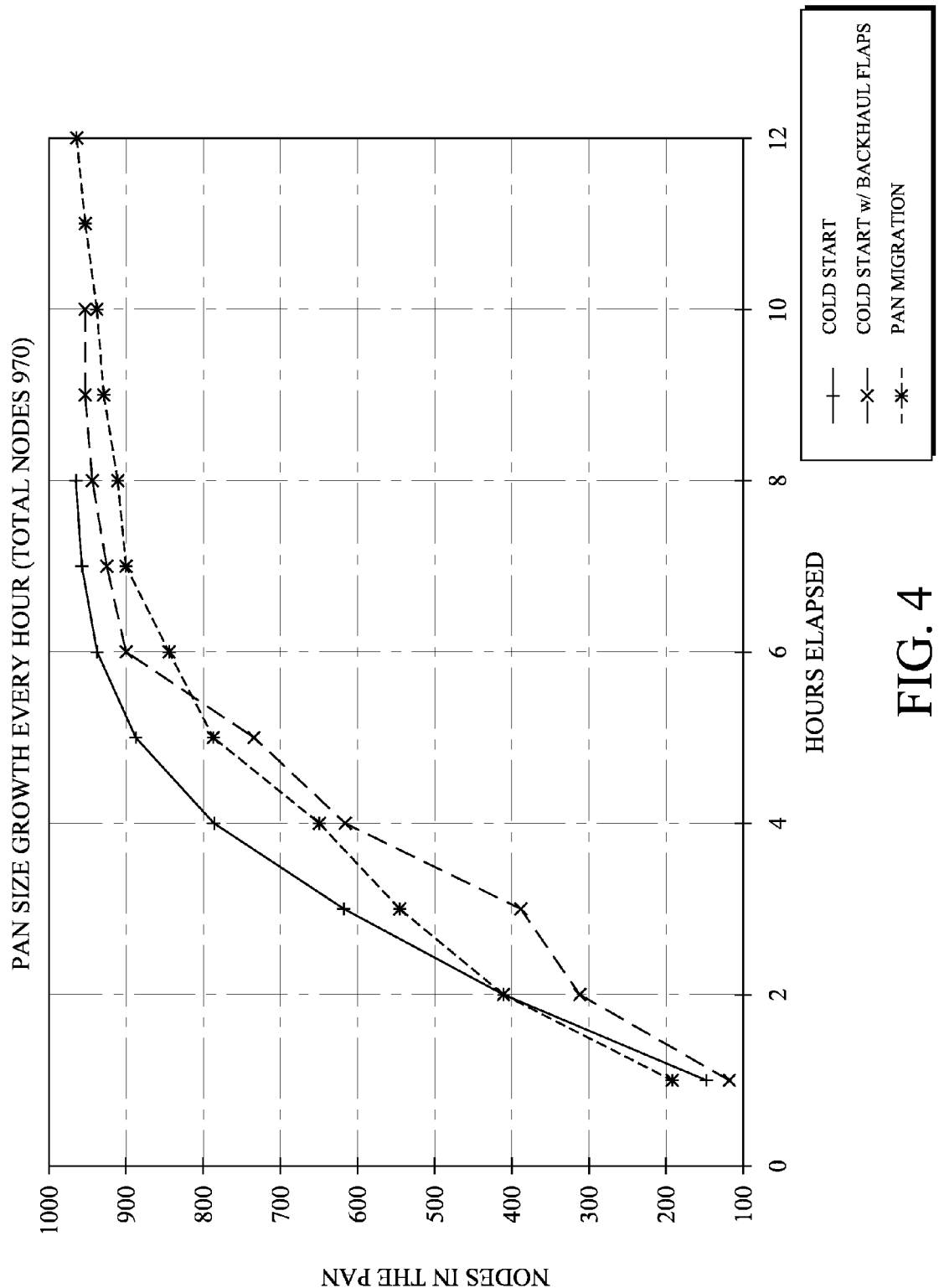
FIG. 4 illustrates an example of node join times.

Note that the total time to make the network operational is unfortunately not a linear function of the number of nodes and time for each node to join the network (see FIG. 4). Indeed, these networks are using shared media, thus having thousands of nodes trying to join the LLNs may lead to major issues, not mentioning that some of these nodes may experience very poor quality paths to the FAR according to their distance and number of hops to the FAR. FIG. 4 shows the number of nodes joining a 1,000 node mesh as a function of time; even in a relatively small network (1,000) one can observe the non-linearity of the joining time.

Unfortunately, in steady state, opportunities for computing these joining times are extremely rare since joining times T[i] for node Ni can only be computed when nodes join the network after a Field Area Router (FAR) reboot (crash or software upgrades), when nodes reboot themselves after a firmware upgrade or when joining a PAN after a PAN migration. Observation of real-life deployed networks show that such events do not take place often enough to "train" the LM.

Regardless of the LM technique in use, in order to perform regression, the LM requires gathering training sets. The aim of the techniques herein is to gather training sets at a faster pace using a "smart, triggered reboot" that would otherwise not be possible in steady state network. It is critically important, however, to stress the fact that the techniques herein for triggering a mesh reformation for gathering new joining times may also be used in order to gather other network metrics such as the time for a node migrate to another PAN.

Said differently, the techniques herein specify a new mode of operation (smart FAR restart) allowing a Learning Machine to "fast gather" training sets by triggering FAR reboot in order to compute additional joining times T[i] provided to the Learning Machine. First the FAR determines that it requires additional reboot times to train the LM. Then the FAR saves its state on an external server such as the NMS or locally in non-volatile memory. Then a newly defined Reboot Request message is sent across the network. Upon receiving the request nodes evaluate whether the FAR restart is acceptable (potentially joining other instances, PAN, buffering in-progress forwarded traffic) or whether such a restart is not acceptable. Collecting nodes' feedback, the FAR then runs a decision algorithm to process with the restart or postpone the operation. In the former case, the mesh reforms thus collecting new joining times used as training dataset.

Illustratively, the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

Operationally, the techniques herein specify a new mode of operation referred to as the Forced Mesh Restart (FMR). FMR consists of triggering an incremental PAN reformation resulting in the re-creation of the already created mesh. This is done to force the nodes in the network to rejoin the same mesh and thus generate training sets while doing so. A brute force method would simply consist of rebooting the FAR that connects the LLN to the PAN (usually acting as the DAG root and PAN coordinator in IEEE 802.15.4). This would lead to all nodes rejoining the PAN and thus causing the LLNs to reform with potential loss of critical traffic. This would result in triggering a large amount of joining times to be computed. Such a brute force approach is clearly not desirable since all soft states maintained on the FAR would also be lost, traffic would be dropped, the network may be non operational precisely when critical traffic flows in the network need to be transported. Furthermore FAR reboot is an expensive and time-consuming operation that requires planning and coordination of several entities on the customer side. It is also a process that can seldom be repeated on a regular basis.

To overcome these shortcomings, the techniques herein trigger FAR reboots at appropriate times along with a series of mechanisms that dramatically mitigate the impact on the network.

If a Learning Machine (LM) is available to predict quiet periods (this may be a different LM from the one that is consuming the information about joining times), then such information may be used to compute the most appropriate time to trigger a FAR reboot. A newly defined message is specified that is sent by the $LM_d$ (distributed LM) to the FAR indicating the exact time at which the FAR should reboot. As a reminder, the FAR reboot triggers mesh formation, thus leading to gathering mesh formation times, as required to gather additional training set. Although predicting a quiet period helps mitigate the impact of a FAR reboot, additional mechanisms may be utilized to make the operation non disruptive.

A first component of the techniques herein consists of saving all gathered states located on the FAR. In one embodiment, the FAR may save its volatile state on the NMS 150 in cases where the FAR does not have the necessary non-volatile storage capabilities. In another embodiment, a newly defined message is sent to the NMS that carries all soft states information collected by the FAR (routing, DPI output, traffic matrix, QoS but also Learning Machines states hosted on the FAR). After reboot, a second message is sent by the FAR in order to restore all previous states. Note that this message is also used in order to notify the NMS of the planned reboot, should the NMS require canceling the operation (e.g., if a firmware upgrade is planned). In another embodiment, the FAR could locally store the states.

Figure 5:
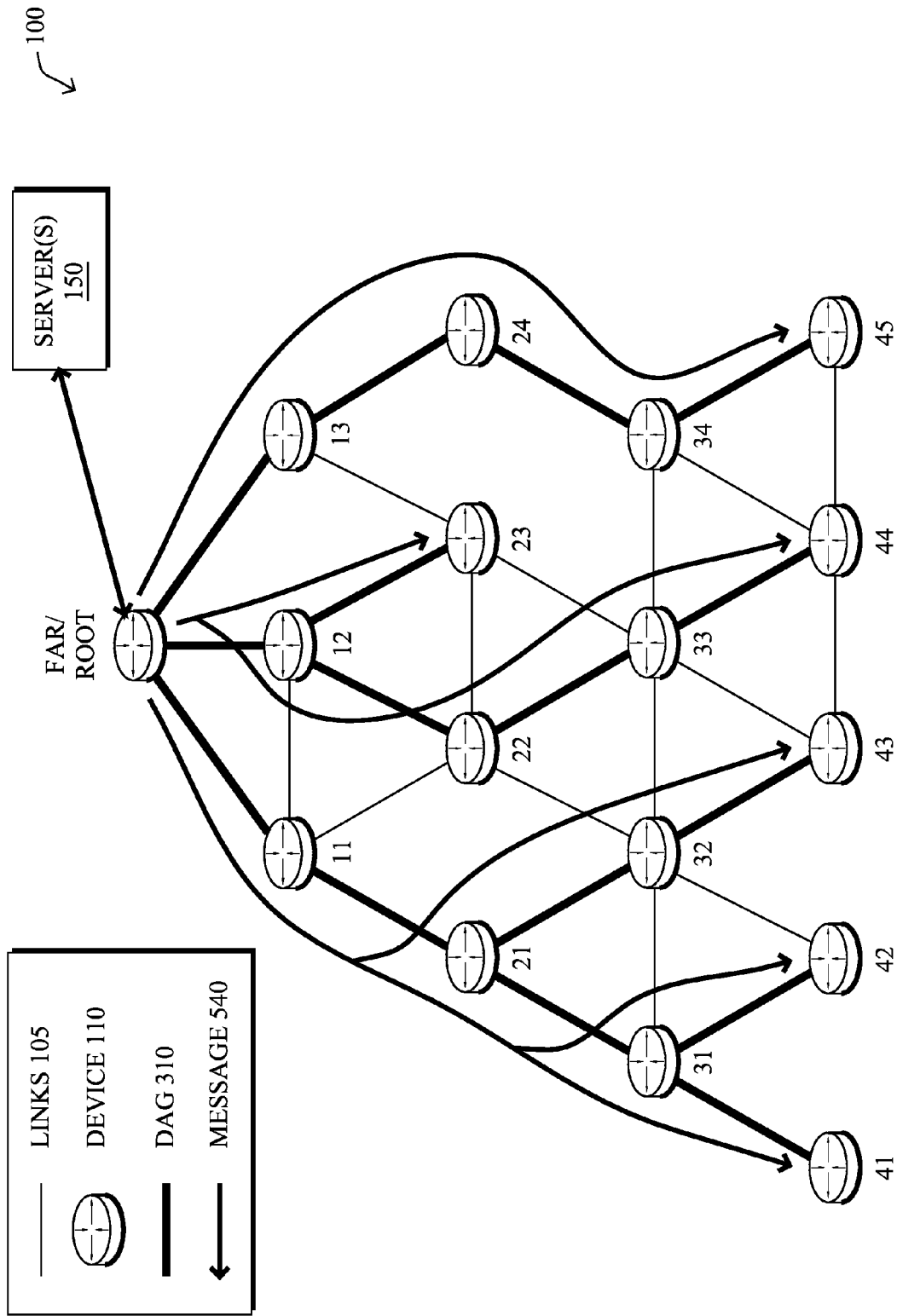
FIG. 5 illustrates an example instruction message.
Figure 6:
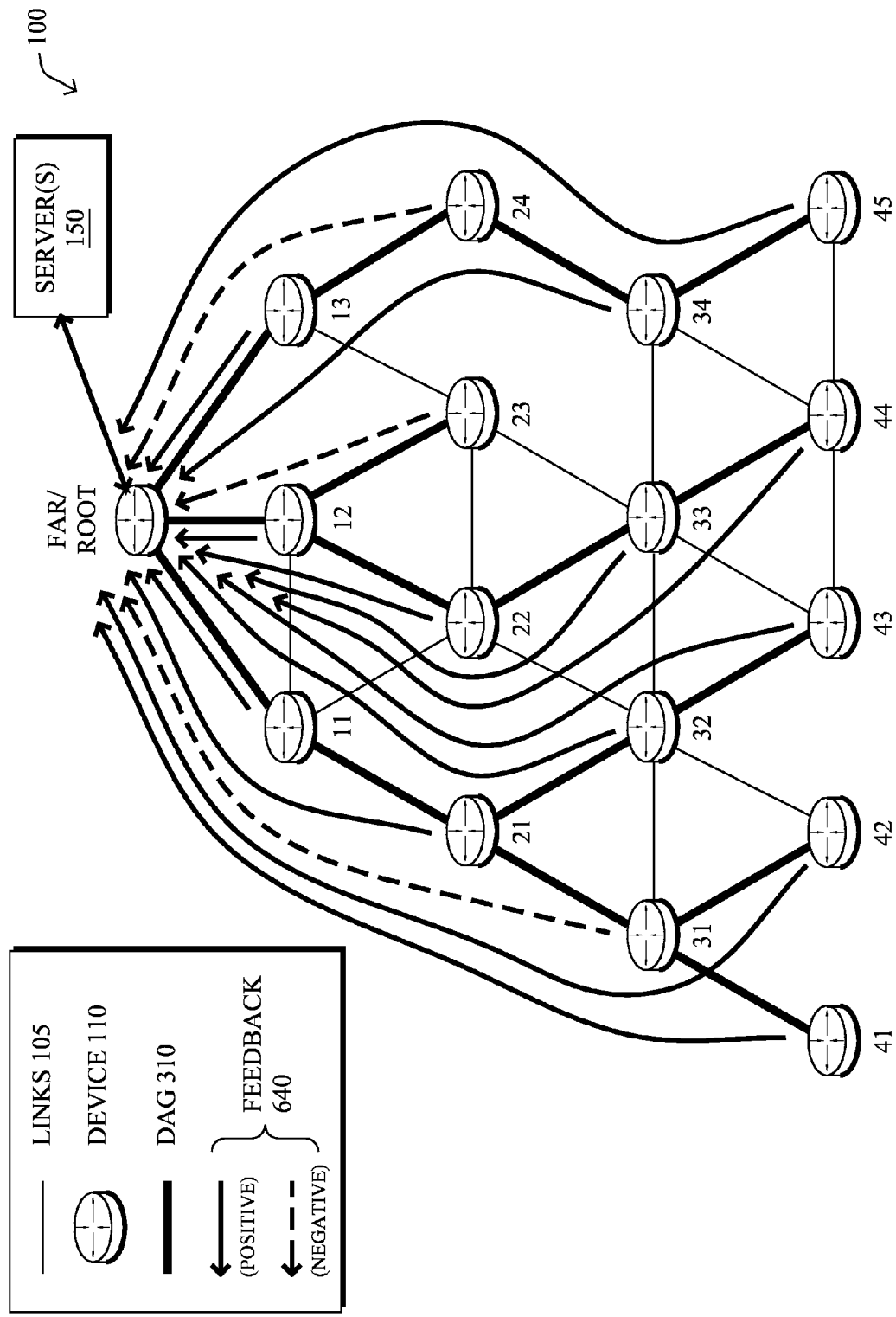
FIG. 6 illustrates an example of feedback messages.

A second component of the techniques herein is a newly defined message 540 (FIG. 5) used by the FAR to 1) indicate to all nodes in the network that the FAR is planning a triggered reboot, 2) trigger local actions on each node (see below), and 3) collect node feed-back 640 (FIG. 6) to potentially cancel the operation should the reboot time be unacceptable for a large number of nodes in the network.

1) Indicating to all nodes in the network that the FAR is planning a triggered reboot: The techniques herein define a broadcast message called Reboot Request (RR) (e.g., IPv6 multicast, or potentially a broadcast 15.4 frame if broadcast is supported by the link layer), that indicates the time T at which the FAR plans to perform a restart. Note that (T-Current_time)<X seconds, where X is large enough to provide feed-back as described below. The FAR may also indicate the predicted (approximate) reboot duration in the RR message.

2) Trigger local actions on each node: upon receiving the RR message each node performs the following action:

If the node is not currently forwarding critical flows (e.g., marked with DSCP X, Y, tagged as critical MAC frame, etc.), the nodes enter a buffering mode and start buffering all incoming data packets thus stopping their forwarding of data packets. Then, a jittered positive feedback (PFB) message is forwarded to the FAR (using for example a unicast message such as a DAO in RPL or a MAC frame) indicating that the node does not object to the FAR restart.

In contrast, if the node is currently forwarding critical traffic or is currently finalizing a critical operation (such as reporting states, or data to a collection engine or NMS) a newly defined negative feed-back (NFB) message is sent back to the FAR objecting to the FAR restart. (Note that PFB and NFB messages may generally be jittered within a time period less than X, and optionally learned upon PAN joining.)

In another embodiment, a node based on prior history can also notify the period up to which it will not be forwarding any critical traffic. If this period is soon, then the FAR can decide to postpone rebooting (taking all such notification into account) or can decide to help this node to join the mesh sooner.

After the expiration of the grace period X, the FAR collects all feed-back messages in order to determine whether it can safely complete the FAR restart operation. Note that a mode of operation may consist in either reporting all feedback (positive and negative), or only the positive feedback or negative feedback (in order to reduce the control traffic). For example, to reduce the number of feedback messages 640 received when receiving only negative feedback, no answer/feed-back is equivalent to a positive feedback. If |PFB|/Number_of_nodes<Y (the ratio of positive feed-back is high enough), the FAR triggers the FAR restart at time T; otherwise the restart is postponed and the algorithm described above is triggered at a later time, potentially according to a pre-configured policy or when a new quiet period is detected. Should an LM have been used to predict T, such a cancellation may be provided to the LM to train that predictive Learning Machine.

Note that in another embodiment other evaluation criteria may be used to cancel a FAR restart (absolute number of node of type X instead of the ratio of node non objecting: indeed a small number of critical objecting nodes may justify to cancel the restart).

Figure 7:
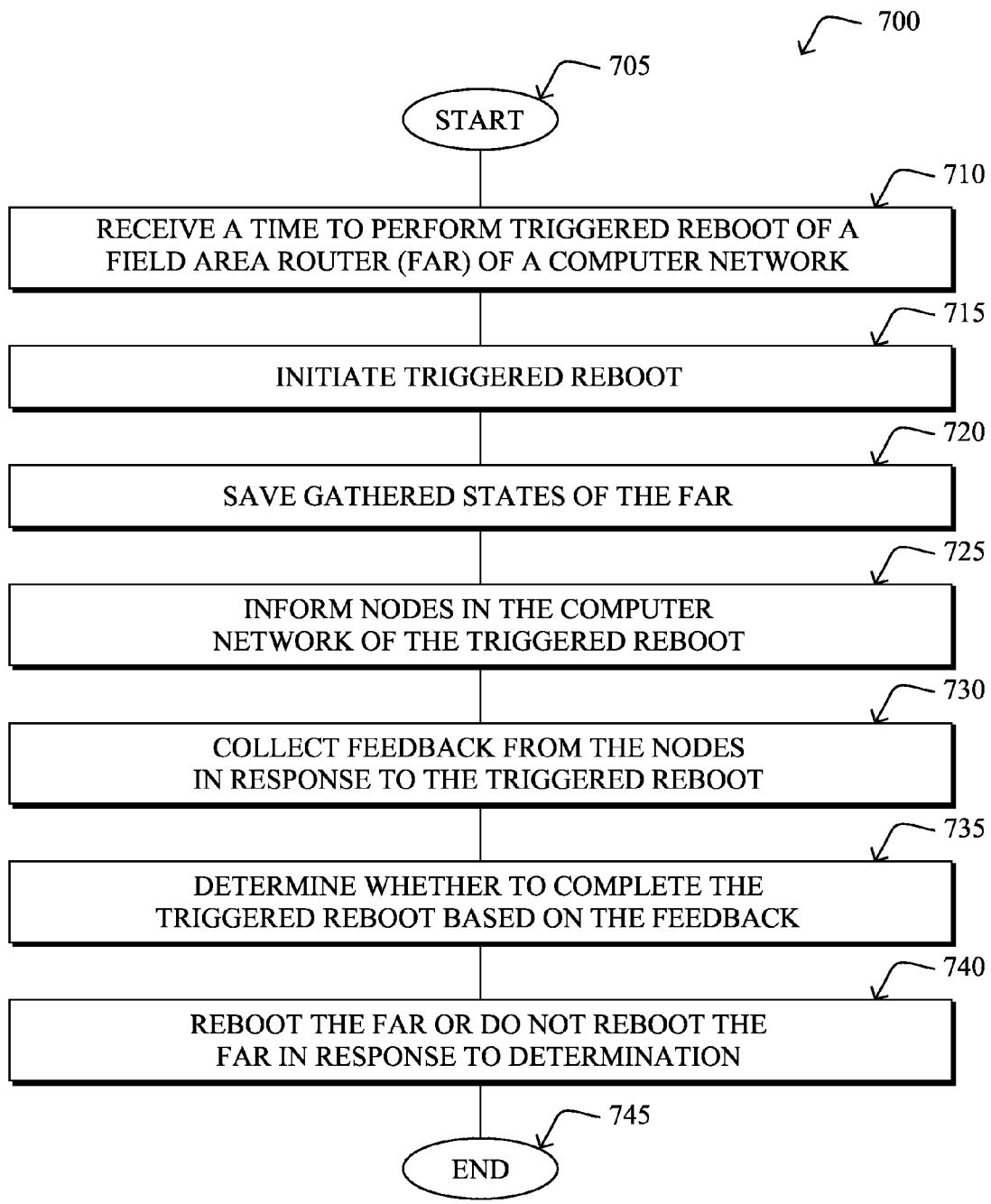
FIGS. 7-8 illustrate example simplified procedures for a smart, triggered reboot in accordance with one or more embodiments described herein.

FIG. 7 illustrates an example simplified procedure 700 for a smart, triggered reboot in accordance with one or more embodiments described herein, from the perspective of the FAR (or NMS). The procedure 700 may start at step 705, and continues to step 710, where, as described in greater detail above, the FAR may receive a time to perform the triggered reboot, such as based on a predicted quiet period of the computer network. In step 715 (e.g., at that time), the FAR initiates a triggered reboot, and saves gathered states of the FAR in step 720. As mentioned, the states may be saved locally on the FAR, or else by sending the gathered states to an NMS to be restored after rebooting. In step 725, the FAR informs nodes in the computer network of the triggered reboot, such as using a broadcast message that indicates the time and/or duration of the reboot. Accordingly, in step 730, the FAR (or other management device) may collect feedback from the nodes in response to the triggered reboot, and determines whether to complete the triggered reboot based on the feedback in step 735. Notably, the feedback may be positive feedback (indicating negative feedback by not responding), negative feedback (indicating positive feedback by not responding), or both positive and negative feedback. Also, as described above, determining whether to complete the triggered reboot is based on one of either a number or ratio of nodes (or critical nodes) indicating negative feedback. In step 740, the FAR either reboots or does not reboot in response to determining to complete or not to complete the triggered reboot, respectively. Note that not rebooting may further comprise sending a notification that the FAR is not rebooting (e.g., to the nodes, NMS, or otherwise). Moreover, determining not to complete the triggered reboot may comprise determining to delay the triggered reboot, as noted above. The procedure 700 then ends in step 745.

Figure 8:
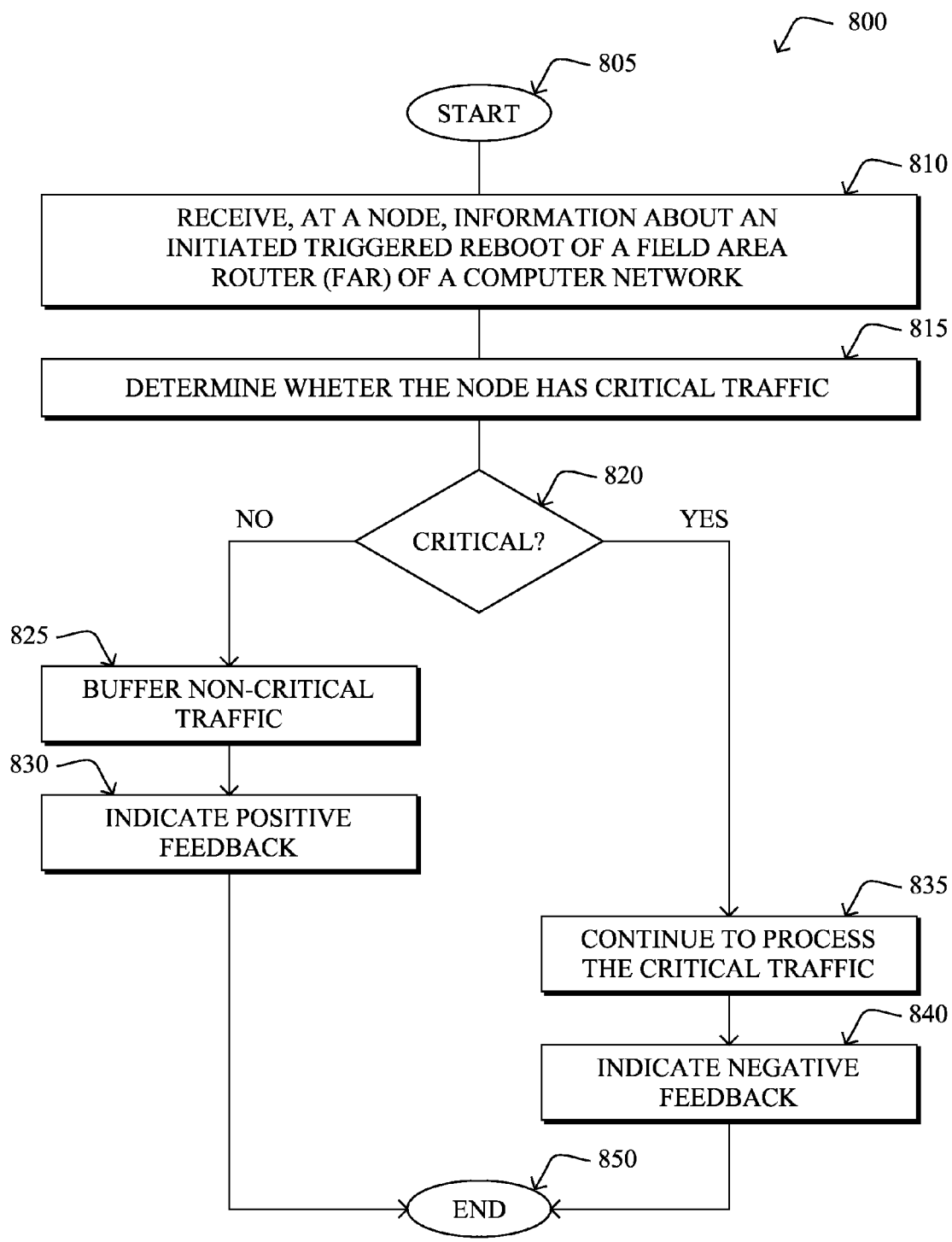

In addition, FIG. 8 illustrates an example simplified procedure 800 for a smart, triggered reboot in accordance with one or more embodiments described herein, from the perspective of a node. The procedure 800 may start at step 805, and continues to step 810, where, as described in greater detail above, the node receives information about an initiated triggered reboot of a FAR. In response, in step 815, the node determines whether it has critical traffic, which as noted above, may be either of current critical traffic being processed or future expected critical traffic at the node. If there is no critical traffic at step 820, then in step 825 the node buffers non-critical traffic and indicates positive feedback in response to the triggered reboot in step 830. On the other hand, in response to the node having critical traffic in step 820, then in step 835 the node continues to process the critical traffic and indicates negative feedback in response to the triggered reboot in step 840. The procedure 800 ends in step 845, notably with the possibility of the FAR completing its intended reboot, and the node participating, accordingly.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, provide for fast learning to train learning machines using smart-triggered reboot. In particular, the techniques herein allow for fast training of a Learning Machine performing regression on training sets in order to perform anomaly detection. Accordingly, the Learning Machine becomes operational very quickly, without impacting the network operation.

While there have been shown and described illustrative embodiments that provide for fast learning to train learning machines using smart-triggered reboot, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a processor, a need for additional reboot times to compute additional joining times;
   in response to determining the need for additional reboot times to compute additional joining times, initiating, by the processor, a triggered reboot of a field area router (FAR) of a computer network during a quiet period of the network predicted by a learning machine process;
   saving, by the processor, gathered states of the FAR;
   informing, by the processor, nodes in the computer network of the triggered reboot;
   collecting, by the processor, feedback from the nodes in response to the triggered reboot;
   determining, by the processor whether to complete the triggered reboot based on the feedback; and
   rebooting the FAR in response to determining to complete the triggered reboot.

2. The method as in claim 1, further comprising:
   receiving a time to perform the triggered reboot.

3. The method as in claim 1, further comprising:
   saving one or more of the gathered states by sending the gathered states to a network management server (NMS); and
   restoring the one or more of the gathered states from the NMS after rebooting the FAR.

4. The method as in claim 1, further comprising:
   saving one or more of the gathered states locally on the FAR.

5. The method as in claim 1, wherein informing the nodes comprises a broadcast message.

6. The method as in claim 1, wherein informing the nodes includes one or both of a time of the triggered reboot and an approximate duration of the triggered reboot.

7. The method as in claim 1, wherein the feedback is selected from positive feedback, negative feedback, and both positive and negative feedback.

8. The method as in claim 1, wherein determining whether to complete the triggered reboot is based on one of either a number or ratio of nodes indicating negative feedback.

9. The method as in claim 1, wherein determining whether to complete the triggered reboot is based on one of either a number or ratio of critical nodes of the nodes in the network indicating negative feedback.

10. The method as in claim 1, further comprising:
    not rebooting the FAR in response to determining not to complete the triggered reboot; and
    in response, sending a notification that the FAR is not rebooting.

11. The method as in claim 10, wherein determining not to complete the triggered reboot comprises determining to delay the triggered reboot.

12. An apparatus, comprising:
    one or more network interfaces to communicate with a computer network;
    a processor coupled to the network interfaces and adapted to execute one or more processes; and
    a memory configured to store a process executable by the processor, the process when executed operable to:
      determine a need for additional reboot times to compute additional joining times;
      in response to determining the need for additional reboot times to compute additional joining times, initiate a triggered reboot of a field area router (FAR) of the computer network during a quiet period of the network predicted by a learning machine process;
      save gathered states of the FAR;
      inform nodes in the computer network of the triggered reboot;
      collect feedback from the nodes in response to the triggered reboot;
      determine whether to complete the triggered reboot based on the feedback; and
      reboot the FAR in response to determining to complete the triggered reboot.

13. The apparatus as in claim 12, wherein the process when executed is further operable to:
  receive a time to perform the triggered reboot.

14. The apparatus as in claim 12, wherein the process when executed is further operable to:
  save the gathered states either locally on the FAR or by sending the gathered states to a network management server (NMS) and restoring the one or more of the gathered states from the NMS after rebooting the FAR.

15. The apparatus as in claim 12, wherein determining whether to complete the triggered reboot is based on one of: a number of nodes indicating negative feedback, a ratio of nodes indicating negative feedback, a number of critical nodes of the nodes in the network indicating negative feedback, or a ratio of critical nodes indicating negative feedback.

16. The apparatus as in claim 12, wherein the process when executed is further operable to:
  not reboot the FAR in response to determining not to complete the triggered reboot; and
  in response, send a notification that the FAR is not rebooting.

17. A tangible, non-transitory, computer-readable media having software encoded thereon, the software when executed by a processor operable to:
  determine a need for additional reboot times to compute additional joining times;
  in response to determining the need for additional reboot times to compute additional joining times,
  initiate a triggered reboot of a field area router (FAR) of the computer network during a quiet period of the network predicted by a learning machine process;
  save gathered states of the FAR;
  inform nodes in the computer network of the triggered reboot;
  collect feedback from the nodes in response to the triggered reboot;
  determine whether to complete the triggered reboot based on the feedback; and
  reboot the FAR in response to determining to complete the triggered reboot.

18. The tangible, non-transitory, computer-readable media as in claim 17, wherein the process when executed is further operable to:
  receive a time to perform the triggered reboot.

19. The tangible, non-transitory, computer-readable media as in claim 17, wherein the process when executed is further operable to:
  save the gathered states either locally on the FAR or by sending the gathered states to a network management server (NMS) and restoring the one or more of the gathered states from the NMS after rebooting the FAR.

20. The tangible, non-transitory, computer-readable media as in claim 17, wherein determining whether to complete the triggered reboot is based on one of: a number of nodes indicating negative feedback, a ratio of nodes indicating negative feedback, a number of critical nodes of the nodes in the network indicating negative feedback, or a ratio of critical nodes indicating negative feedback.

* * * * *